(12) United States Patent
Yoo et al.

(10) Patent No.: US 11,070,241 B2
(45) Date of Patent: Jul. 20, 2021

(54) METHOD FOR PERFORMING COMMUNICATION WITH EXTERNAL ELECTRONIC DEVICE USING RESONANT FREQUENCY MODIFIED ACCORDING TO PROXIMITY OF EXTERNAL OBJECT, AND ELECTRONIC DEVICE SUPPORTING SAME

(71) Applicant: Samsung Electronics Co., Ltd., Suwon-si (KR)

(72) Inventors: Donghyun Yoo, Hwaseong-si (KR); Chanho Park, Hwaseong-si (KR); Yongam Son, Yongin-si (KR); Sangha Lee, Suwon-si (KR); Seunghak Lee, Hwaseong-si (KR); Yunchul Yi, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/647,123

(22) PCT Filed: Sep. 20, 2018

(86) PCT No.: PCT/KR2018/011113
§ 371 (c)(1),
(2) Date: Mar. 13, 2020

(87) PCT Pub. No.: WO2019/059670
PCT Pub. Date: Mar. 28, 2019

(65) Prior Publication Data
US 2020/0280330 A1    Sep. 3, 2020

(30) Foreign Application Priority Data

Sep. 22, 2017    (KR) .................. 10-2017-0122713

(51) Int. Cl.
*H04B 1/04* (2006.01)
*H04B 1/38* (2015.01)
(Continued)

(52) U.S. Cl.
CPC ........... *H04B 1/3827* (2013.01); *H04B 1/401* (2013.01)

(58) Field of Classification Search
None
See application file for complete search history.

(56) References Cited

U.S. PATENT DOCUMENTS 7,495,652 B2    2/2009    Klinghult
8,537,055 B2 *  9/2013    Waku ................. G06K 19/0726
                                                        343/702

(Continued)

FOREIGN PATENT DOCUMENTS

KR    10-2008-0073138 A    8/2008
KR    10-2012-0092062 A    8/2012
(Continued)

OTHER PUBLICATIONS

European Search Report dated Jul. 17, 2020; European Appln. No. 18859843.7- 1220 / 3672089 PCT/KR2018011113.
(Continued)

*Primary Examiner* — Pablo N Tran
(74) *Attorney, Agent, or Firm* — Jefferson IP Law, LLP

(57) ABSTRACT

According to various embodiments of the present invention, an electronic device comprises: an emitter; a communication circuit electrically connected to the emitter and configured to transmit or receive a signal by using the emitter; a sensor circuit electrically connected to the emitter and configured to measure a capacitance corresponding to an external object adjacent to the emitter; a frequency adjustment circuit electrically connected to the emitter and capable of adjusting (Continued)

a resonance frequency of the emitter; and a processor, wherein, the processor is configured to: confirm the capacitance corresponding to the external object by using the sensor circuit while performing communication with an external device by using the communication circuit; set the frequency adjustment circuit to a first mode when the capacitance falls under a specified first range, and perform the communication by using the communication circuit in a state in which the frequency adjustment circuit is set to the first mode; and set the frequency adjustment circuit to a second mode when the capacitance falls under a specified second range, and perform the communication by using the communication circuit in a state in which the frequency adjustment circuit is set to the second mode. Other embodiments are possible.

17 Claims, 10 Drawing Sheets

(51) Int. Cl.
  *H04B 1/3827* (2015.01)
  *H04B 1/401* (2015.01)

(56) References Cited

U.S. PATENT DOCUMENTS

| | | | | |
|---|---|---|---|---|
| 8,577,289 | B2* | 11/2013 | Schlub | H03K 17/955 455/41.1 |
| 8,903,322 | B2* | 12/2014 | Wang | H04W 88/02 455/63.1 |
| 8,977,318 | B2* | 3/2015 | Yu | H04W 52/38 455/566 |
| 9,203,463 | B2* | 12/2015 | Asrani | H04M 1/0202 |
| 9,692,875 | B2 | 6/2017 | Novet | |
| 2010/0103055 | A1 | 4/2010 | Waku et al. | |
| 2012/0075159 | A1 | 3/2012 | Chang et al. | |
| 2012/0206556 | A1 | 8/2012 | Yu et al. | |
| 2012/0214412 | A1 | 8/2012 | Schlub et al. | |
| 2013/0241780 | A1 | 9/2013 | Amm et al. | |
| 2013/0344914 | A1 | 12/2013 | Wang | |
| 2014/0080548 | A1 | 3/2014 | Chen et al. | |
| 2014/0155000 | A1* | 6/2014 | Erkens | H04B 1/3833 455/73 |
| 2014/0333496 | A1* | 11/2014 | Hu | H01Q 9/0421 343/745 |
| 2015/0172426 | A1* | 6/2015 | Asrani | H04B 1/40 455/77 |
| 2015/0215901 | A1 | 7/2015 | Lee et al. | |
| 2017/0164300 | A1 | 6/2017 | Lee et al. | |
| 2017/0294931 | A1* | 10/2017 | Chou | H04B 1/3833 |

FOREIGN PATENT DOCUMENTS

| | | |
|---|---|---|
| KR | 10-2015-0090790 A | 8/2015 |
| KR | 10-2017-0067548 A | 6/2017 |
| TW | I597947 B | 9/2017 |

OTHER PUBLICATIONS

Korean Office Action dated May 25, 2021, issued in Korean Patent Application No. 10-2017-0122713.

* cited by examiner

METHOD FOR PERFORMING COMMUNICATION WITH EXTERNAL ELECTRONIC DEVICE USING RESONANT FREQUENCY MODIFIED ACCORDING TO PROXIMITY OF EXTERNAL OBJECT, AND ELECTRONIC DEVICE SUPPORTING SAME

TECHNICAL FIELD

Various embodiments of the disclosure relate to a method and an electronic device for performing communication with an external electronic device, using a resonant frequency changed according to the proximity of an external object.

BACKGROUND ART

In general, an electronic device (e.g., a smart phone) may include a radiator (e.g., an antenna) for wireless communication.

Due to the property of the radiator provided in the electronic device, a resonant frequency may be changed when the radiator comes into contact with an external object having a conductive property. Due to the changed resonant frequency, the performance of the radiator of the electronic device may be degraded, which may result in the degradation of communication performance.

In order to prevent the communication performance from being degraded, the radiator of the electronic device may include a switch for shifting the resonant frequency. In the electronic device, the switch may be controlled so as to shift (or restore) the changed resonant frequency to the previous frequency. Using the resonant frequency shifted (or restored) to the previous frequency, it is possible to prevent the electronic device from being degraded in the communication performance. For example, under a hand effect occurrence condition, it is possible to minimize the hand effect by controlling the antenna switch in a direction of restoring a change in radiator resonance caused due to the hand effect.

DISCLOSURE OF INVENTION

Technical Problem

However, in an electronic device, the radiator may be biased to one side (e.g., right or left) due to the arrangement of a USB or an ear jack in a region adjacent to the radiator, in which case, a substantial difference in the resonant shift of the radiator may occur between the right grip and left grip situations. For example, due to the difference in resonant shift (e.g., the difference in the resonant shift in the left grip or the right grip), the prior art has a problem in that, even though the resonant frequency may be shifted to the previous frequency band for one band, when the same switch control is performed for another band, the another band is not shifted to the previous frequency band. For example, in the case where there is a substantial difference between the resonant shift in the right grip and the resonant shift in the left grip, in the prior art, when the same switch control is applied on a band-by-band basis (e.g., regardless of whether a grip state corresponds to a left grip or a right grip) under a hand effect occurrence condition, performance may be improved for one grip (e.g. the left grip), but performance degradation may occur for the other grip (e.g., the right grip).

In various embodiments, performance degradation in any of a left grip and a right grip may be prevented by recognizing whether a grip state corresponds to a left grip or a right grip and separately applying switch control depending on the grip state.

Solution to Problem

According to various embodiments of the disclosure, an electronic device may include: a radiator; a communication circuit electrically connected to the radiator, the communication circuit being configured to transmit or receive a signal using the radiator; a sensor circuit electrically connected to the radiator and configured to measure a capacitance corresponding to an external object adjacent to the radiator; a frequency adjustment circuit electrically connected to the radiator, the frequency adjustment circuit being configured to be capable of adjusting a resonant frequency of the radiator; and a processor. The processor may be configured to: confirm the capacitance corresponding to the external object using the sensor circuit while communication is being performed with an external device using the communication circuit; designate the frequency adjustment circuit as a first mode when the capacitance falls within a first designated range, and perform the communication using the communication circuit in a state in which the frequency adjustment circuit is designated as the first mode; and designate the frequency adjustment circuit as a second mode when the capacitance falls within a second designated range, and perform the communication using the communication circuit in a state in which the frequency adjustment circuit is designated as the second mode.

According to various embodiments of the disclosure, an electronic device may include: a radiator; a communication circuit electrically connected to the radiator, the communication circuit being configured to transmit or receive a signal using the radiator; a sensor circuit electrically connected to the radiator and configured to measure a capacitance corresponding to an external object adjacent to the radiator; a frequency adjustment circuit electrically connected to the radiator, the frequency adjustment circuit being configured to be capable of adjusting a resonant frequency of the radiator; and a processor. The processor may be configured to: confirm the capacitance corresponding to the external object using the sensor circuit while communication is being performed with an external device using the communication circuit; perform the communication through a first resonant frequency obtained by shifting the resonant frequency by a first designated value using the frequency adjustment circuit when the capacitance falls within a first designated range; and perform the communication through a second resonant frequency obtained by shifting the resonant frequency by a second designated value using the frequency adjustment circuit when the capacitance falls within a second designated range.

According to various embodiments, a method of operating an electronic device may include: an operation of performing communication with an external device using a communication circuit configured to transmit or receive a signal using a radiator; an operation of confirming a capacitance corresponding to an external object using a sensor circuit configured to measure a capacitance corresponding to the external object adjacent to the radiator while the communication is being performed with the external device; an operation of designating a frequency adjustment circuit configured to adjust a resonant frequency of the radiator as a first mode when the capacitance falls within a first designated range, and performing the communication using the communication circuit in a state in which the frequency adjustment circuit is designated as the first mode; and an operation of designating the frequency adjustment circuit as a second mode when the capacitance falls within a second designated range, and performing the communication using the communication circuit in a state in which the frequency adjustment circuit is designated as the second mode.

Advantageous Effects of Invention

According to various embodiments, a method and an electronic device for communicating with an external electronic device using a resonant frequency changed according to proximity of an external object are capable of changing the resonant frequency changed by coming into contact with an external object to the previous frequency by operating switch control in a distinguished manner By changing to the previous frequency band, it is possible to compensate for antenna radiation performance. According to various embodiments, it is possible to prevent performance degradation in any of a left grip and a right grip by recognizing whether the grip state in which the user holds the electronic device corresponds to a left grip or a right grip and separately applying switch control depending on the grip state.

MODE FOR THE INVENTION

Figure 1:
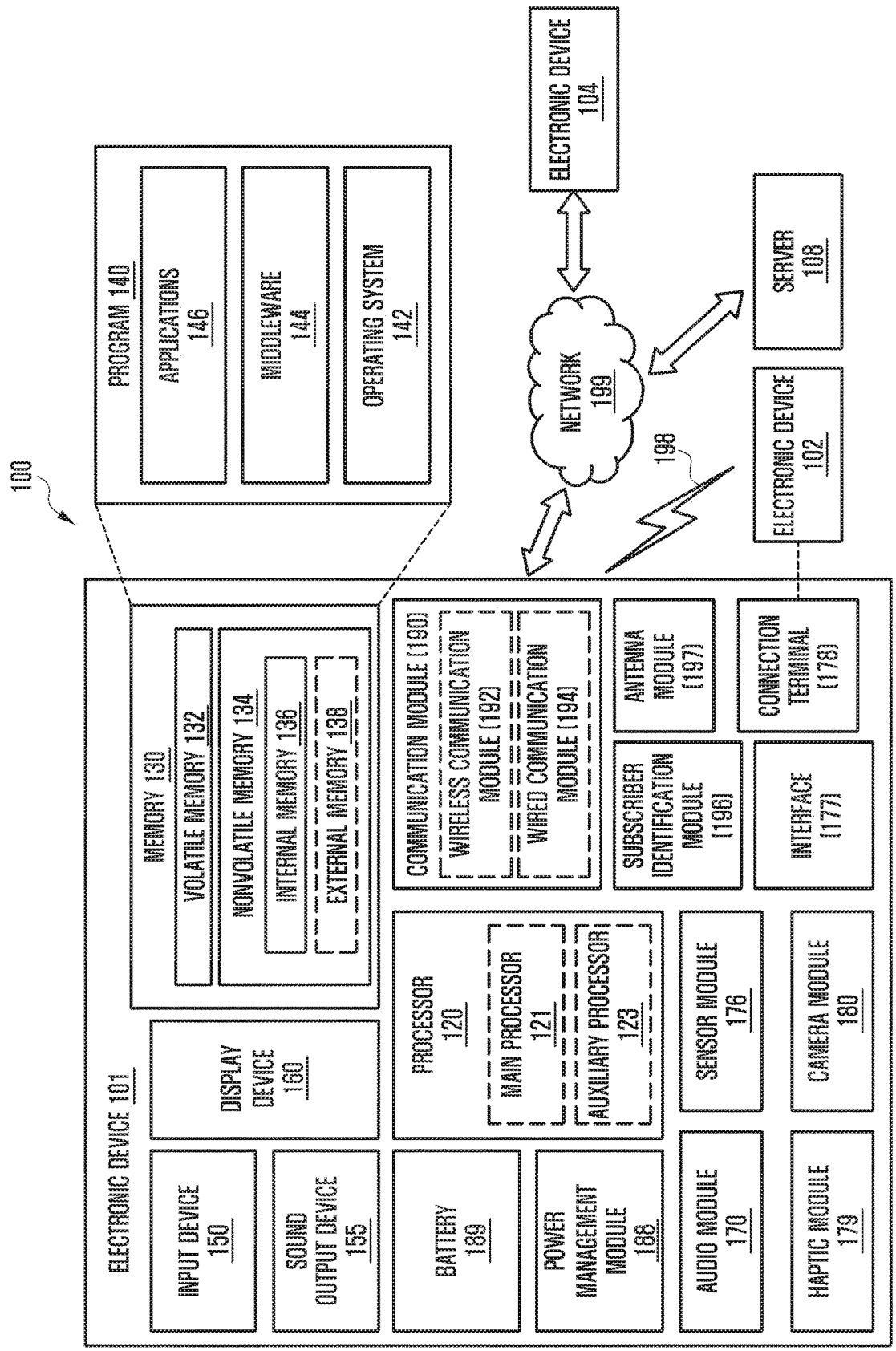
FIG. 1 is a block diagram of an electronic device 101 in a network environment according to various embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., over wires) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., over wires) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., a LAN or a wide area network (WAN)). These various types of communication modules may be implemented as a single component (e.g., a single chip), or may be implemented as multi components (e.g., multi chips) separate from each other.

The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device 101 according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., over wires), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor(e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
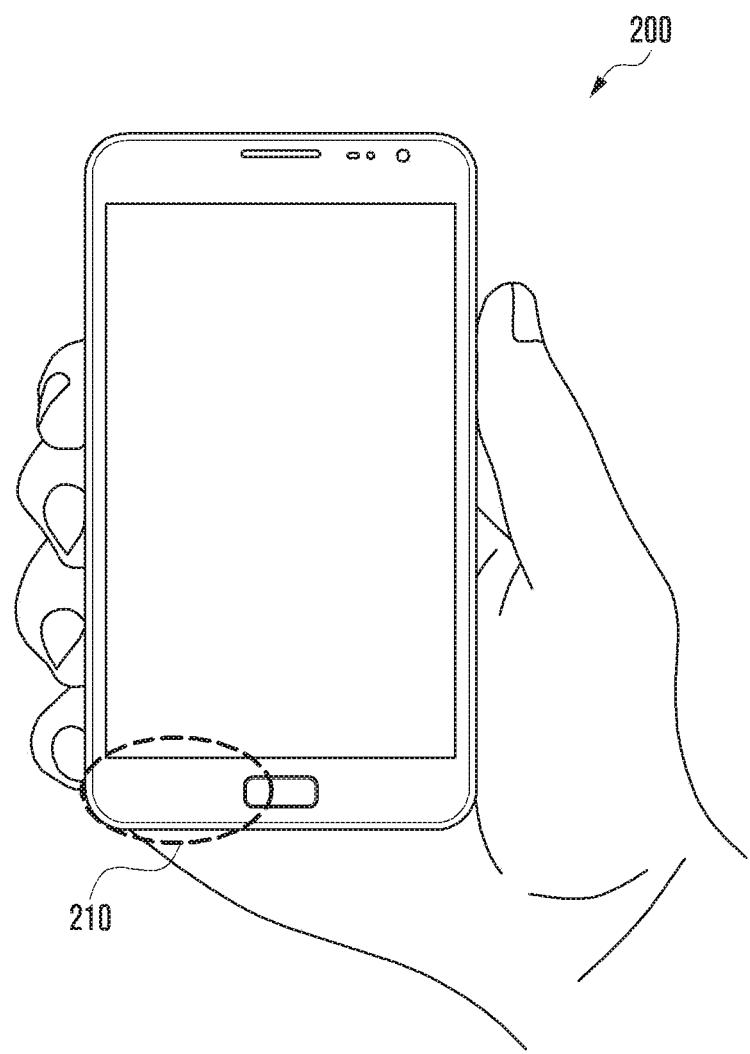
FIGS. 2A and 2B are views illustrating examples in which an electronic device is held.
Figure 2B:
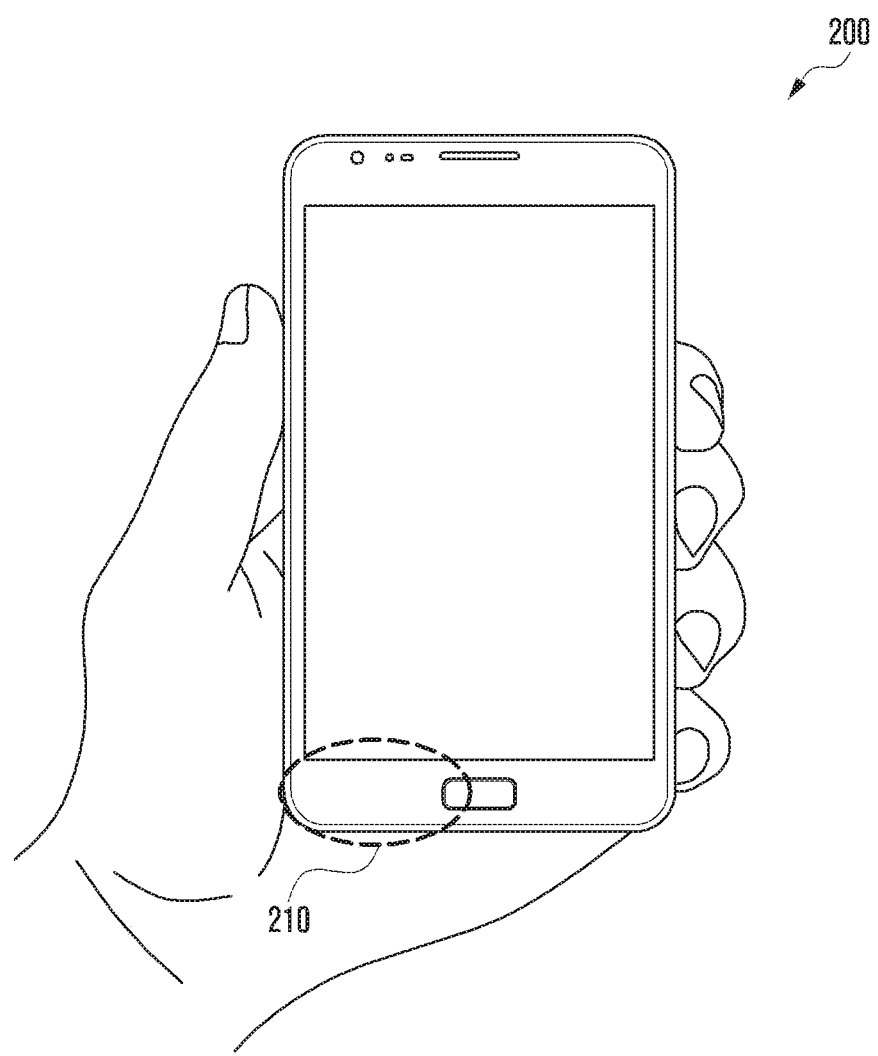

FIGS. 2A and 2B are views illustrating examples in which an electronic device is held.

An electronic device 200 (e.g., the electronic device 101) may include various electronic components and a housing configured to protect the electronic components. For example, among various electronic components of the electronic device 200 (e.g., the electronic device 101 in FIG. 1), a camera, a speaker, and the like may be provided in the upper end portion of the electronic device 200. Among the various electronic components of the electronic device 200, an antenna, a USB port, an ear jack, or the like may be provided in the lower end portion of the electronic device 200. When a radiator 210 (e.g., the antenna module 197 in FIG. 1) of the electronic device 200 is mounted in the lower end portion of the electronic device 200, a radiator 210 may be omnipresent due to the arrangement thereof with respect to other electronic components.

Referring to FIGS. 2A and 2B, the radiator 210 of the electronic device 200 may be omnipresent in the lower end portion of the electronic device 200. For example, the radiator 210 of the electronic device 200 may be disposed at the left side of the lower end portion of the electronic device 200. In FIG. 2A, when the user holds the electronic device 200 with his/her left hand, the distance between the user's left hand (e.g., palm) and the position of the radiator 210 may be relatively short. Referring to FIG. 2B, when the user holds the electronic device 200 with his/her right hand, the distance between the user's right hand (e.g., palm) and the position of the radiator 210 may be relatively long.

Figure 3:
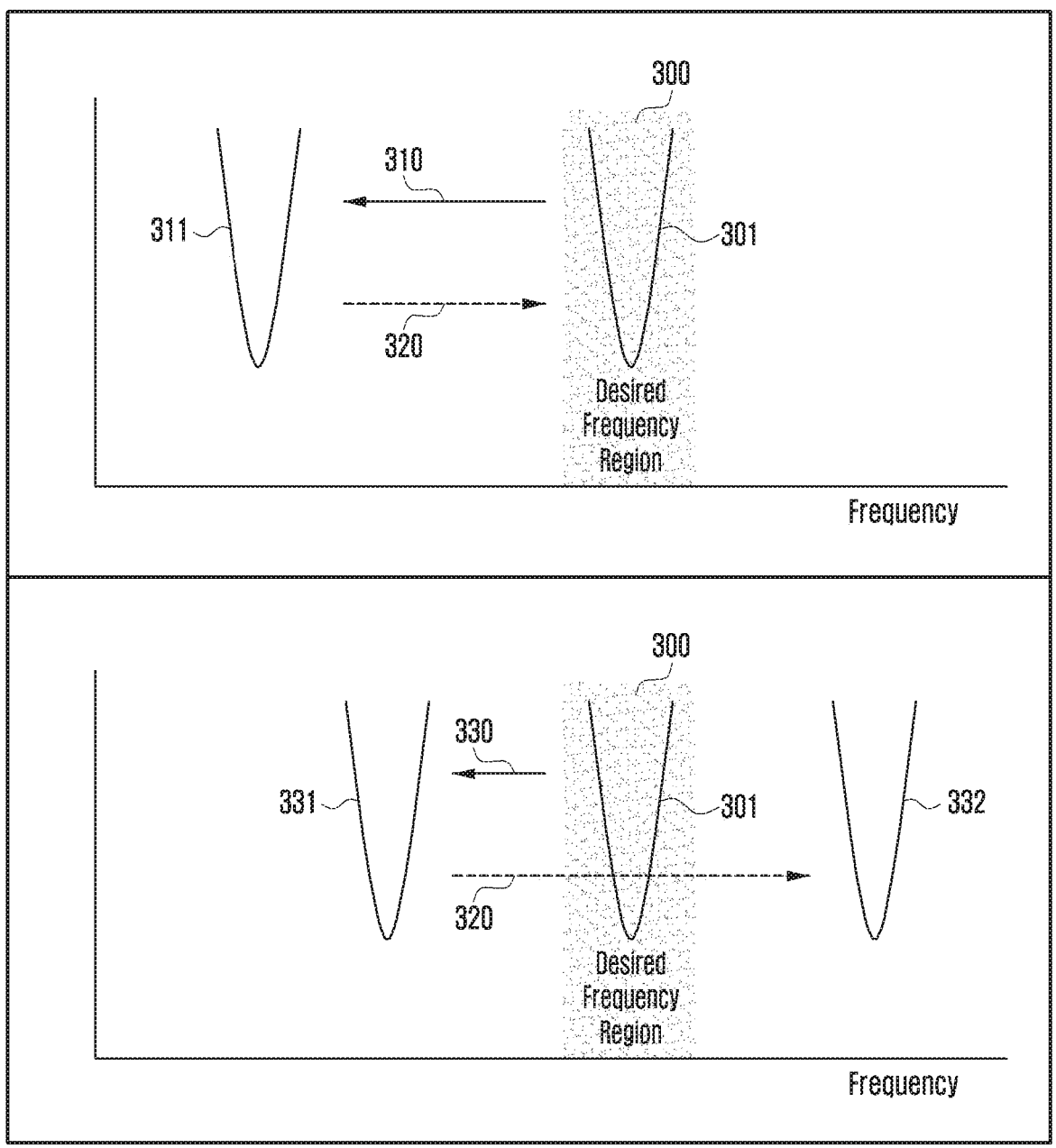
FIG. 3 is a view illustrating a conventional switch control operation.

FIG. 3 is a view illustrating a conventional switch control operation.

Referring to FIG. 3, a radiator (e.g., the antenna module 197 in FIG. 1) of an electronic device (e.g., the electronic device 101 in FIG. 1) may be set such that a resonant frequency 301 is formed in a specific frequency band 300 (e.g., a desired frequency region).

As an embodiment, the user may hold the electronic device with the left hand, which has a conductive property, as illustrated in FIG. 2A. The resonant frequency of the electronic device may be shifted to a changed frequency band. For example, as denoted by reference numeral 310 in FIG. 3, the resonant frequency 301 in a specific frequency band 300 may be shifted to a low-frequency band (e.g., the shifted resonant frequency 311). According to an embodiment, in the prior art, when an electronic device is under a hand effect occurrence condition caused by the user's holding, a switch connected to an antenna may be controlled regardless of the user's holding attitude (e.g., a left grip or a right grip). For example, as denoted by reference numeral 320, in the electronic device, the resonant frequency 311 shifted to the low-frequency band may be shifted to the previous frequency band (e.g., the frequency band 300) by controlling the switch.

As another embodiment, the user may hold the electronic device with the right hand, which has a conductive property, as illustrated in FIG. 2B. The resonant frequency of the electronic device may be shifted to a changed frequency band. For example, as denoted by reference numeral 330 in FIG. 3, the resonant frequency 301 in the specific frequency band 300 may be shifted to a low-frequency band. When comparing reference numeral 330 with reference numeral 310, in the case of being held with the right hand, since the distance to the radiator is relatively long, the resonant frequency may be shifted to a low-frequency band (e.g., a shifted resonant frequency 331) that is somewhat higher (or not lower) than the low-frequency band denoted by reference numeral 310. According to an embodiment, in the prior art, when an electronic device is under a hand effect occurrence condition caused by the user's holding, a switch connected to an antenna may be controlled regardless of the user's holding attitude (e.g., a left grip or a right grip). For example, as denoted by reference numeral 320, in the electronic device, the resonant frequency 331 shifted to the low-frequency band may be shifted up to a frequency band (e.g., a restored resonant frequency 332) higher than the previous frequency band (e.g., the frequency band 300) by controlling the switch. For example, the shift extent of the resonant frequency may be determined based on a relative distance between the radiator omnipresent in the electronic device and a portion with which the user's hand, which has a conductive property, comes into contact.

Conventionally, the same switch control operation is performed without considering the shift extent of the resonant frequency. As a result, as denoted by reference numeral 320, even if the switch control operation previously performed on the electronic device is performed in order to shift the shifted resonant frequency to the previous frequency band (e.g., the frequency band 300), the resonant frequency is not shifted to the previous frequency band since the resonant frequency 332 is shifted to a region other than the specific frequency region 300.

Figure 4A:
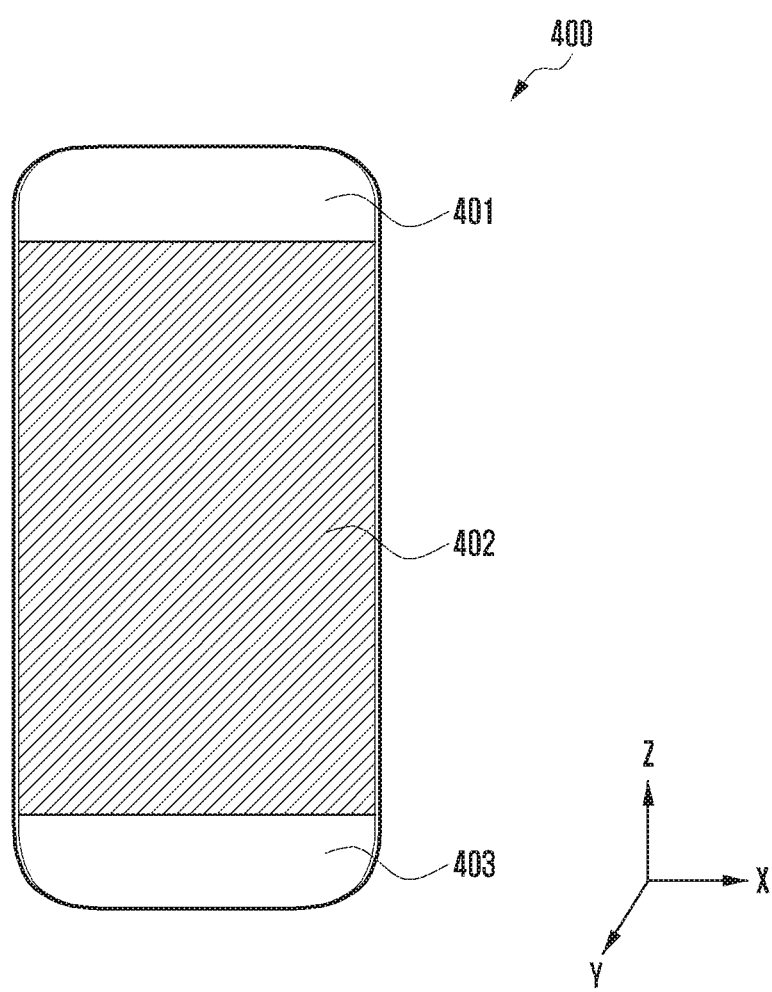
FIGS. 4A and 4B are views illustrating the configuration of an electronic device according to various embodiments.
Figure 4B:
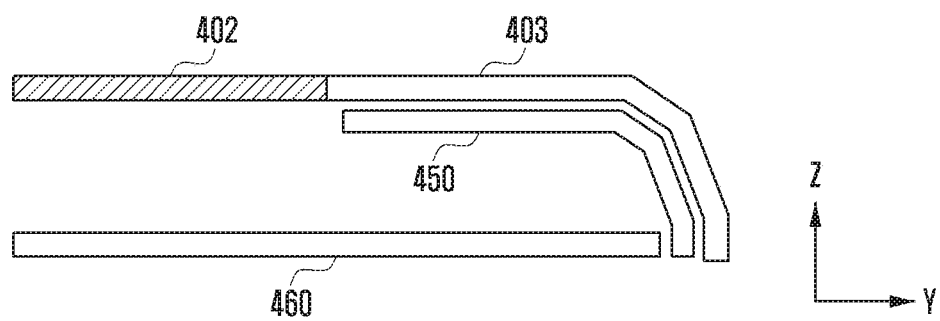

In order to solve this problem, the disclosure may include the configuration of the electronic device illustrated in FIGS. 4A and 4B.

FIGS. 4A and 4B are views illustrating the configuration of an electronic device according to various embodiments.

Referring to FIG. 4A, FIG. 4A may be a schematic view for illustrating materials of a housing of an electronic device 400 (e.g., the electronic device 101 of FIG. 1). For example, the housing of the electronic device 400 may include portions 401 and 403, which have a non-conductive property (e.g., plastic), and a portions 402, which has a conductive property (e.g., metal). Portions 401 and 403 having the non-conductive property in the housing of the electronic device 400 may include an upper end portion 401 and a lower end portion 403. The portion 402 having the conductive property in the housing of the electronic device 400 (e.g., the electronic device 101) may include a portion 402 other than the upper end portion 401 and the lower end portion 403.

Referring to FIG. 4B, FIG. 4B is a cross-sectional view of FIG. 4A and may be a view illustrating, for example, a portion of the lower end portion 403 of the electronic device 400. As illustrated in FIG. 4B, a radiator 450 (e.g., the antenna module 197 in FIG. 1) and a printed circuit board (PCB) 460 may be mounted inside the lower end portion 403 of the electronic device 400. According to an embodiment, the radiator 450 may be mounted in the lower end portion 403 of the electronic device 400 having the non-conductive property so as to block the degradation of communication performance. According to an embodiment, the printed circuit board 460 may be mounted in order to electrically connect and operate various electronic components including the radiator 450.

According to various embodiments of the disclosure, the radiator 450 may be mounted to be electrically connected a sensor (e.g., the sensor module 176 in FIG. 1). According to an embodiment, the sensor may include a grip sensor. Since the grip sensor is mounted to be connected to the radiator 450, an input terminal of the grip sensor may be connected to the radiator 450 in parallel so as to recognize a change amount of capacitance given to the radiator 450. The grip sensor will be described in detail with reference to FIGS. 5A and 5B.

Figure 5A:
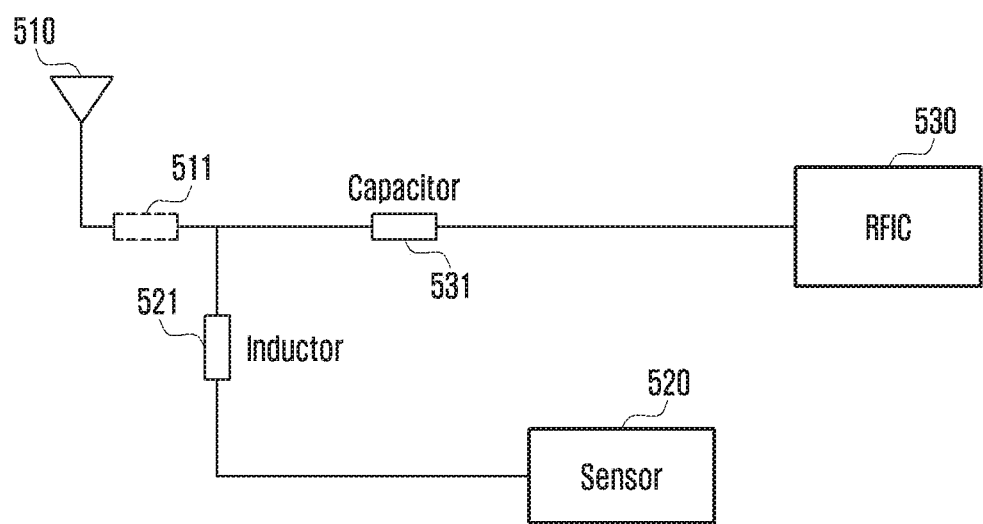
FIG. 5A is an exemplary view illustrating an arrangement of an antenna and a sensor according to various embodiments.
Figure 5B:
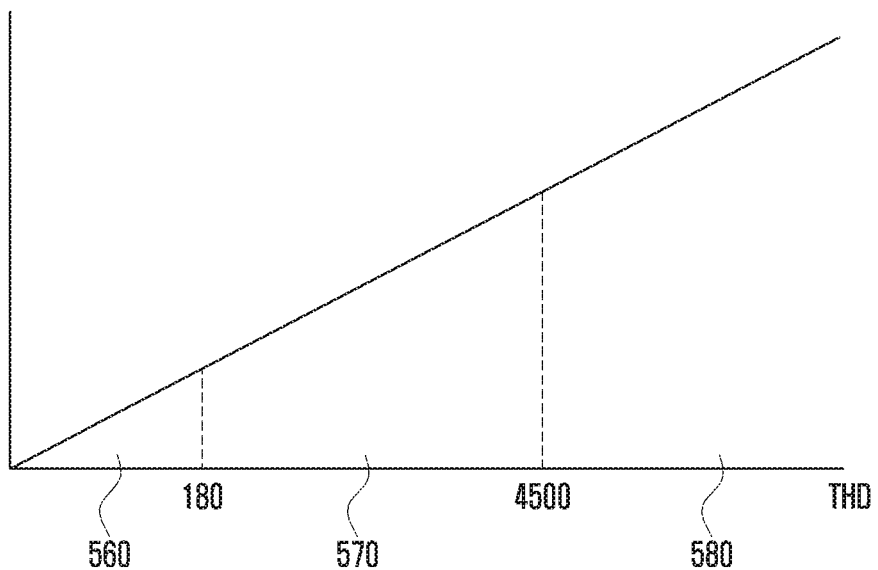
FIG. 5B is a view representing a capacitance measured by the sensor according to the configuration of FIG. 5A.

FIG. 5A is an exemplary view illustrating an arrangement of an antenna and a sensor according to various embodiments. FIG. 5B is a view representing a capacitance value (e.g., capacitance) measured by the sensor according to the arrangement of FIG. 5A.

Referring to FIG. 5A, in the radiator 510 (e.g., the antenna module 197 in FIG. 1), a capacitor 531 and an inductor 521 may be arranged in parallel so as to generate parallel resonance. The disclosure is not limited to parallel resonance, but may also be configured to generate series resonance.

The radiator 510 may radiate an RF signal output from an RFIC (or an RFIC module) 530 therethrough. In the exemplary view of FIG. 5A, the capacitor 511 illustrated adjacent to the radiator 510 may be an equivalent capacitor. The capacitor 511 may not physically exist on the circuit. Alternatively, the capacitor 511 may be included in the radiator 510.

The RFIC 530 may be electrically connected to the radiator 510. According to an embodiment, the RFIC 530 may include a communication circuit (e.g., the communication module 190 in FIG. 1) that transmits or receives a signal (e.g., an RF signal) using the radiator 510. For example, the RFIC 530 may communicate with an external device through the radiator 510 electrically connected thereto.

A sensor 520 (or a sensor circuit) (e.g., the sensor module 176 in FIG. 1) is electrically connected to the radiator 510, and may measure a capacitor value (or capacitance) corresponding to an external object adjacent to the radiator 510. According to an embodiment, the input terminal of the sensor 520 may be configured to be connected in parallel to the radiator 510. For example, when the user holds the electronic device (e.g., the electronic device 101 in FIG. 1) with a his/her hand, which has a conductive property, the capacitor value of the capacitor 511 of the radiator 510 may be changed. According to an embodiment, since the input terminal of the sensor 520 is connected in parallel to the radiator 510, the sensor 520 may sense an amount of change in the capacitor value of the capacitor 511 by comparing the capacitor value (e.g., capacitance) of the capacitor 511 with the capacitor value of an internal capacitor (not shown) of the sensor 520 when the capacitor value of the capacitor value 511 is changed. According to an embodiment, the sensor 520 may include a grip sensor capable of sensing a grip that affects the capacitor value (e.g., capacitance) of the capacitor 511.

Referring to FIG. 5B, when the user holds an electronic device having a radiator 510 mounted to be omnipresent at one side, the capacitor value (e.g., capacitance) measured by the grip sensor may vary depending on which hand the electronic device is held by. In various embodiments, the electronic device may predict (or determine) which hand the electronic device is held by, based on the capacitor value (e.g., capacitance) measured by the grip sensor. Through this, the electronic device may predict (or determine or calculate) a difference in the extent to which the resonant frequency is shifted.

As an embodiment, referring to FIG. 5B, the electronic device may determine which of one or more pre-designated ranges includes the capacitor value (e.g., capacitance) of the sensor 520, and may determine whether the electronic device is held by the left hand or the right hand based on the range that includes the capacitor value. The one or more pre-designated ranges may include one or more thresholds. The one or more thresholds may be set based on the capacitor value (e.g., capacitance) measured by the sensor 520 when the electronic device is held by the left hand and the capacitor value (e.g., capacitance) measured by the sensor 520 when the electronic device is held by the right hand.

For example, as illustrated in the drawing of FIG. 2A, when the electronic device 200 is held by the user's left hand, since the distance between the hand and the mounted radiator 210 is relatively shorter than that when the electronic device is held by the right hand, the amount of change in capacitor value may be large due to the great deterioration of the performance of the radiator 210. According to an embodiment, the sensor 520 may calculate a sensor value of a first value (e.g., about 6000) in proportion to the amount of change in capacitor value.

For example, as illustrated in the drawing of FIG. 2A, when the electronic device 200 is held by the user's right hand, since the distance between the hand and the mounted radiator 210 is relatively longer than that when the electronic device 200 is held by the left hand, the amount of change in capacitor value may be small due to the relatively small deterioration of the performance of the radiator 210. According to an embodiment, the sensor 520 may calculate a sensor value of a second value (e.g., about 3000) in proportion to the amount of change in capacitor value when the electronic device is held by the left hand. According to an embodiment, a threshold (or a reference value) for identifying which hand the electronic device is held in based on the average of sensor values may be a third value (e.g., about 4500).

According to various embodiments, when a capacitor value falls within a range 570 corresponding to the threshold (e.g., about 4500) or less, the electronic device may determine that the user holds the electronic device with his/her right hand (or in the right grip). According to various embodiments, when a capacitor value falls within a range 580 corresponding to the threshold (e.g., about 4500) or more, the electronic device may determine that the user holds the electronic device with his/her left hand (or in the left grip).

According to an embodiment, in the example of FIG. 5B, a capacitor value in the range 560 below a specific threshold (e.g., threshold 180) may be a range that is not recognized by the sensor 560. Based on this, the electronic device 200 may determine whether or not the electronic device 200 is held by the user. As an example, the electronic device 200 may calculate a sensor value when the electronic device 200 is not in contact with a conductor. The calculated sensor value may be set as a threshold, for example, a second threshold for determining whether to hold or not the electronic device is held. In another embodiment, an average of sensor values may be calculated and set as a threshold for determining whether or not the electronic device is performed. For example, when the calculated average value is a specific value (e.g., about 180), the specific value may be set as a second threshold for determining whether the electronic device is held.

According to various embodiments, assuming that a threshold for distinguishing a left hand and a right hand from each other is a first threshold (e.g., about 4500), when the capacitor value falls within a range 570 formed by the first threshold and the second threshold (e.g., about 180), the electronic device may determine that the user holds the electronic device with his/her right hand According to various embodiments, when a capacitor value falls within a range 580 (e.g., a value of 4500 or more) corresponding to the first threshold (e.g., about 4500) or more, the electronic device may determine that the user holds the electronic device with his/her left hand According to various embodiments, when a capacitor value falls within a range 560 corresponding to the second threshold (e.g., about 180) or more, the electronic device may determine that the user does not hold the electronic device.

Figure 6:
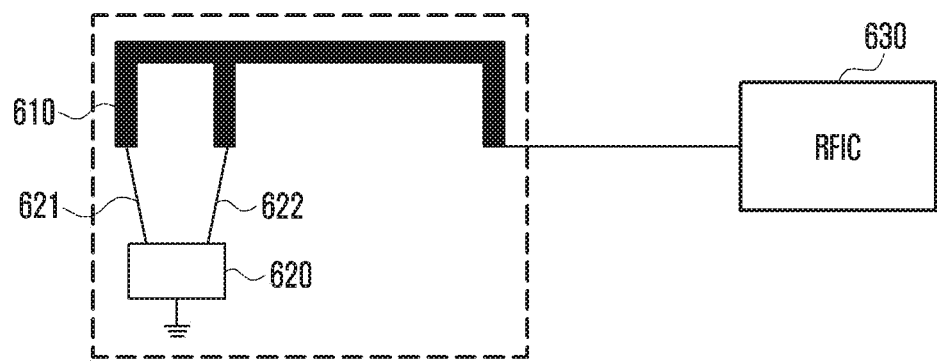
FIG. 6 is a view illustrating an arrangement of an antenna and a frequency adjustment circuit according to various embodiments.

FIG. 6 is a view illustrating an arrangement of an antenna and a frequency adjustment circuit according to various embodiments.

Referring to FIG. 6, the electronic device (e.g., the electronic device 101 in FIG. 1) may include a radiator 610 (e.g., the antenna module 197 in FIG. 1) electrically connected to an RFIC (or an RFIC module) 630. The electronic device may include a frequency adjustment circuit electrically connected to the radiator 610 in order to tune (or adjust) the resonant frequency band. According to an embodiment, the frequency adjustment circuit may include a switch 620 electrically connected to the radiator 610 so as to adjust the resonant frequency of the radiator 610.

As an embodiment, the electronic device (e.g., the processor 120 of the electronic device 101) may control the resonant path by adjusting the length of the radiator 610 by controlling the switch 620. As the resonant path is changed and the length of the radiator 610 is increased or shortened, the band in which the resonant frequency is formed may be changed. As another embodiment, the electronic device may include a switch configured to connect a plurality of matching circuits to the radiator 610. The plurality of matching circuits may have different matching values.

According to various embodiments, as illustrated in FIG. 2A, when a conductor comes into contact with the electronic device at a distance close to the radiator 610 of the electronic device, the performance degradation of the radiator 610 is great, and thus the resonant frequency may be formed in a band far from the pre-designated frequency band. In order to shift the shifted resonant frequency to the previous frequency band, the processor (e.g., the processor 120 in FIG. 1) of the electronic device may perform control such that a portion of the switch 620 (e.g., a first element 621) comes into contact (is connected) with the radiator 610 so as to shift the resonant path. For example, the processor 120 may allow a portion of the switch 620 (e.g., the first element 621) to be connected with the radiator 610 so that the length of the radiator 610 (or the length of an antenna pattern) is adjusted by a first length of the first element 621, and may enable communication to be performed using the radiator 610 in the state adjusted by the first length.

According to various embodiments, as illustrated in FIG. 2B, when a conductor comes into contact with the electronic device at a distance that does not close to the radiator 610 of the electronic device, the performance degradation of the radiator 610 is small, and thus the resonant frequency may be formed in a band close to the pre-designated frequency band. In order to shift the shifted resonant frequency to the previous frequency band, the processor (e.g., the processor 120 in FIG. 1) of the electronic device may perform control such that another portion of the switch 620 (e.g., a second element 622) comes into contact (is connected) with the radiator 610 so as to shift the resonant path. For example, the processor 120 may allow the another portion of the switch 620 (e.g., the second element 622) to be connected with the radiator 610 so that the length of the radiator 610 (or the length of an antenna pattern) is adjusted by a second length of the second element 622, and may enable communication to be performed using the radiator 610 in the state adjusted by the second length.

Figure 7:
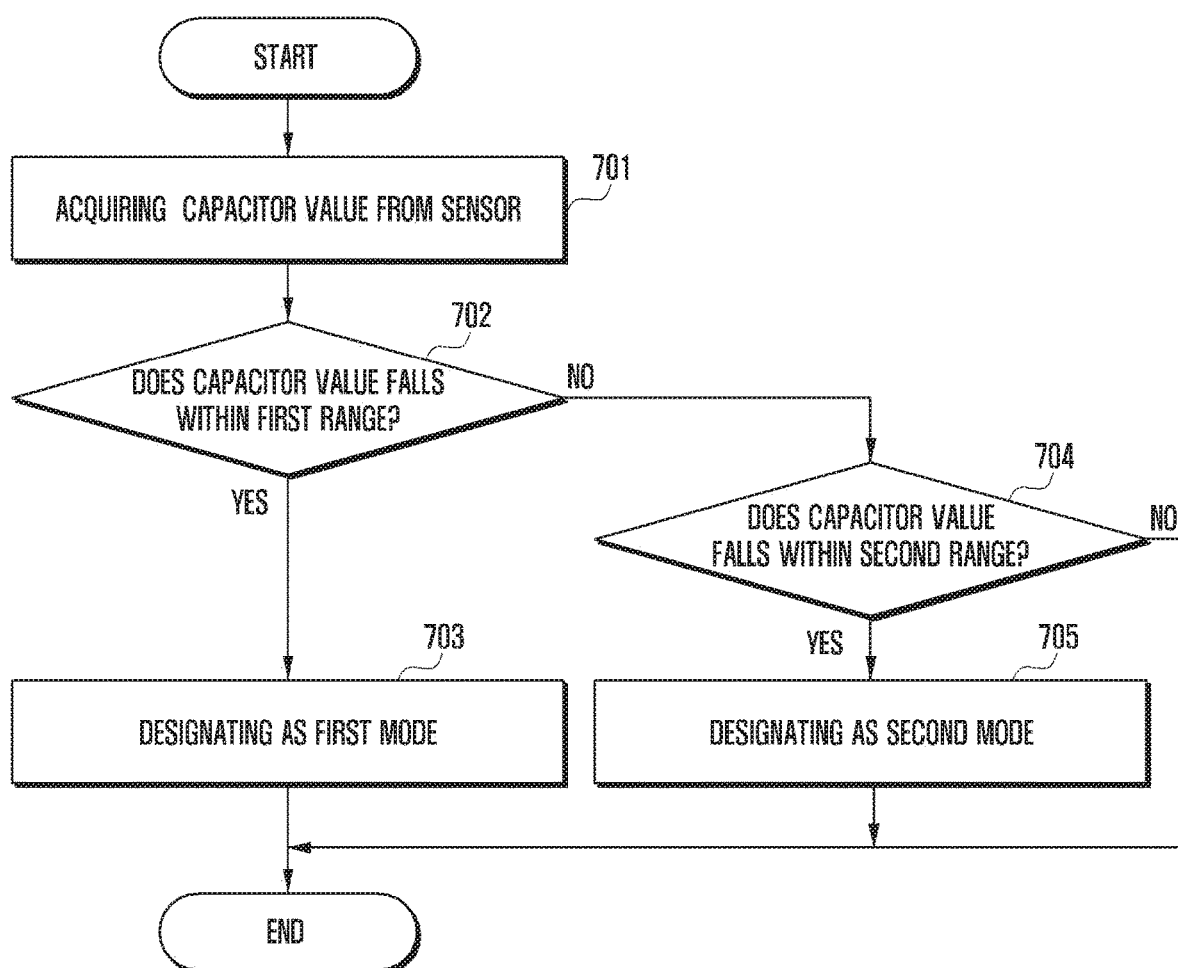
FIG. 7 is a flowchart illustrating a method of operating an electronic device according to various embodiments.

FIG. 7 is a flowchart illustrating a method of operating an electronic device according to various embodiments.

Referring to FIG. 7, in operation 701, a processor (e.g., the processor 120 in FIG. 1) of an electronic device (e.g., the electronic device 101) may acquire a capacitor value from a sensor (e.g., the sensor 520 in FIG. 5A). In addition, the processor 120 may acquire a sensor value calculated from the capacitor value. In the following operation, an example in which the processor 120 acquires a capacitor value from a sensor will be described. According to an embodiment, the processor 120 may measure a capacitance corresponding to an external object (e.g., the user's hand) adjacent to the radiator using a sensor (e.g., the sensor 520 of FIG. 5A) while communicating with an external device using a communication circuit (e.g., the RFIC 630 in FIG. 6).

In operation 702, the processor 120 may determine whether the acquired capacitor value (or capacitance) falls within a first range. According to an embodiment, the first range may include a range denoted by reference numeral 570 in FIG. 5B (e.g., a threshold of 180 to 4500).

As a result of the determination in operation 702, when it is determined that the capacitor value falls within the first range, the processor 120 may proceed to operation 703. In operation 703, the processor 120 may designate an operation mode of the frequency adjustment circuit (e.g., the switch 620 in FIG. 6) as a first mode. According to various embodiments, the first mode may include, for example, a mode in which the processor 120 shifts the resonant frequency to a first designated frequency. According to an embodiment, the first mode may include, for example, a mode in which the processor 120 shifts the resonant frequency by a first pre-designated value. According to an embodiment, when the capacitor value (or capacitance) falls within the first range, the processor 120 may designate the frequency adjustment circuit as the first mode (e.g., adjusting the radiator 610 by a first length by connecting a portion of the second switch 620 (e.g., the first element 621 in FIG. 6) to the radiator 610), and may allow the communication to be performed using the communication circuit in the state in which the frequency adjustment circuit is designated as the first mode. According to an embodiment, when the capacitor value (or capacitance) falls within the first designated range, the processor 120 may allow communication to be performed through the first resonant frequency obtained by shifting the resonant frequency by the first designated value using the frequency adjustment circuit.

As a result of the determination in operation 702, when it is determined that the capacitor value does not fall within the first range, the processor 120 may proceed to operation 704.

In operation 704, the processor 120 may determine whether the acquired capacitor value (or capacitance) falls within a second range. According to an embodiment, the second range may include a range denoted by reference numeral 580 in FIG. 5B (e.g., a threshold of 4500 or more).

As a result of the determination in operation 704, when it is determined that the capacitor value falls within the second range, the processor 120 may proceed to operation 705. In operation 705, the processor 120 may designate the operation mode of the frequency adjustment circuit as a second mode.

As a result of the determination in operation 704, when it is determined that the capacitor value does not fall within the second range, the processor 120 may terminate the process. According to various embodiments, the second mode may include, for example, a mode in which the processor 120 shifts the resonant frequency to a second designated frequency. According to an embodiment, the second mode may include, for example, a mode in which the processor 120 shifts the resonant frequency by a second pre-designated value. According to an embodiment, when the capacitor value (or capacitance) falls within the second range, the processor 120 may designate the frequency adjustment circuit as the second mode (e.g., adjusting the radiator 610 by a second length by connecting another portion of the second switch 620 (e.g., the second element 622 in FIG. 6) to the radiator 610), and may allow the communication to be performed using the communication circuit in the state in which the frequency adjustment circuit is designated as the second mode. According to an embodiment, when the capacitor value (or capacitance) falls within the second designated range, the processor 120 may allow communication to be performed through the second resonant frequency obtained by shifting the resonant frequency by the second designated value using the frequency adjustment circuit.

Various embodiments of the disclosure disclosed in this specification and the drawings are provided merely to represent specific examples for the purpose of easily describing the technical contents of the disclosure and helping the understanding of the disclosure, and are not intended to limit the scope of the disclosure. Accordingly, the scope of the disclosure should be construed in such a manner that, in addition to the embodiments disclosed herein, all changes or modifications derived from the technical idea of the disclosure are included in the scope of the disclosure.

The invention claimed is:

1. An electronic device comprising:
a radiator;
a communication circuit electrically connected to the radiator, the communication circuit being configured to transmit or receive a signal using the radiator;
a sensor circuit electrically connected to the radiator and configured to measure a capacitance corresponding to an external object adjacent to the radiator;
a frequency adjustment circuit electrically connected to the radiator, the frequency adjustment circuit being configured to be capable of adjusting a resonant frequency of the radiator; and
a processor, wherein the processor is configured to:
confirm the capacitance corresponding to the external object using the sensor circuit while communication is being performed with an external device using the communication circuit;
designate the frequency adjustment circuit as a first mode when the capacitance falls within a first designated range, and perform the communication using the communication circuit in a state in which the frequency adjustment circuit is designated as the first mode; and
designate the frequency adjustment circuit as a second mode when the capacitance falls within a second designated range, and perform the communication using the communication circuit in a state in which the frequency adjustment circuit is designated as the second mode,
wherein the first designated range and the second designated range comprise capacitance levels indicating that the external object is adjacent to the radiator of the electronic device.

2. The electronic device of claim 1, wherein the first mode comprises a mode for shifting the resonant frequency to a first frequency.

3. The electronic device of claim 1, wherein the first mode comprises a mode for shifting the resonant frequency by a first pre-designated value.

4. The electronic device of claim 1, wherein the second mode comprises a mode for shifting the resonant frequency to a second frequency.

5. The electronic device of claim 1, wherein the second mode comprises a mode for shifting the resonant frequency by a second pre-designated value.

6. The electronic device of claim 1, wherein the radiator is mounted to be omnipresent in a portion of a housing of the electronic device.

7. The electronic device of claim 6, wherein the portion of the housing has a non-conductive property.

8. The electronic device of claim 1, wherein the first designated range and the second designated range are preset based on a capacitance measured from the sensor circuit.

9. The electronic device of claim 1, wherein the sensor circuit comprises a sensor circuit of a grip sensor.

10. An electronic device comprising:
a radiator;
a communication circuit electrically connected to the radiator, the communication circuit being configured to transmit or receive a signal using the radiator;
a sensor circuit electrically connected to the radiator and configured to measure a capacitance corresponding to an external object adjacent to the radiator;
a frequency adjustment circuit electrically connected to the radiator, the frequency adjustment circuit being configured to be capable of adjusting a resonant frequency of the radiator; and
a processor,
wherein the processor is configured to:
confirm the capacitance corresponding to the external object using the sensor circuit while communication is being performed with an external device using the communication circuit;
perform the communication through a first resonant frequency obtained by shifting the resonant frequency by a first designated value using the frequency adjustment circuit when the capacitance falls within a first designated range; and
perform the communication through a second resonant frequency obtained by shifting the resonant frequency by a second designated value using the frequency adjustment circuit when the capacitance falls within a second designated range, and
wherein the first designated range and the second designated range comprise capacitance levels indicating that the external object is adjacent to the radiator of the electronic device.

11. The electronic device of claim 10, wherein the radiator is mounted to be omnipresent in a portion of a housing of the electronic device, and the portion of the housing has a non-conductive property.

12. The electronic device of claim 10, wherein the first designated range and the second designated range are preset based on a capacitance measured from the sensor circuit.

13. A method of operating an electronic device, the method comprising:
performing communication with an external device using a communication circuit configured to transmit or receive a signal using a radiator;
confirming a capacitance corresponding to an external object using a sensor circuit configured to measure a capacitance corresponding to the external object adjacent to the radiator while the communication is being performed with the external device;
designating a frequency adjustment circuit configured to adjust a resonant frequency of the radiator as a first mode when the capacitance falls within a first designated range, and performing the communication using the communication circuit in a state in which the frequency adjustment circuit is designated as the first mode; and
designating the frequency adjustment circuit as a second mode when the capacitance falls within a second designated range, and performing the communication using the communication circuit in a state in which the frequency adjustment circuit is designated as the second mode, wherein the first designated range and the second designated range comprise capacitance levels indicating that the external object is adjacent to the radiator of the electronic device.

14. The method of claim 13, wherein the first mode comprises a mode for shifting the resonant frequency to a first frequency, and the second mode comprises a mode for shifting the resonant frequency to a second frequency.

15. The method of claim 13, wherein the first mode comprises a mode for shifting the resonant frequency by a first pre-designated value, and the second mode comprises a mode for shifting the resonant frequency by a second pre-designated value.

16. The method of claim 13, wherein the sensor circuit comprises a grip sensor and the first mode is selected when a first grip is identified by a first associated capacitance and the second mode is selected when a second grip is identified by a second associated capacitance.

17. The method of claim 13, wherein the adjusting of the resonant frequency of the radiator by the frequency adjustment circuit comprises adjusting a length of the radiator by a switch.

\* \* \* \* \*